US011881188B2

(12) United States Patent
Xu et al.

(10) Patent No.: US 11,881,188 B2
(45) Date of Patent: Jan. 23, 2024

(54) ARRAY SUBSTRATE INCLUDING STAGES OF GATE ARRAY UNITS HAVING DIFFERENT SIZED OUTPUT TRANSISTORS, AND DISPLAY PANEL

(71) Applicant: Shenzhen China Star Optoelectronics Semiconductor Display Technology Co., Ltd., Shenzhen (CN)

(72) Inventors: Zhida Xu, Shenzhen (CN); Ilgon Kim, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/969,567

(22) PCT Filed: Jun. 2, 2020

(86) PCT No.: PCT/CN2020/093852
§ 371 (c)(1),
(2) Date: Aug. 13, 2020

(87) PCT Pub. No.: WO2021/232488
PCT Pub. Date: Nov. 25, 2021

(65) Prior Publication Data
US 2023/0101702 A1 Mar. 30, 2023

(30) Foreign Application Priority Data
May 21, 2020 (CN) ......................... 202010435253.7

(51) Int. Cl.
*G09G 3/36* (2006.01)
*G09G 3/3266* (2016.01)

(52) U.S. Cl.
CPC ......... *G09G 3/3677* (2013.01); *G09G 3/3266* (2013.01)

(58) Field of Classification Search
None
See application file for complete search history.

(56) References Cited

U.S. PATENT DOCUMENTS

2009/0009497 A1* 1/2009 Lee ...................... G09G 3/3677 345/205
2010/0283955 A1* 11/2010 Kim ...................... G02F 1/1345 349/149
2011/0249210 A1 10/2011 Yun
2016/0232866 A1* 8/2016 Cho ....................... H03K 17/56
(Continued)

FOREIGN PATENT DOCUMENTS

CN 102221762 A 10/2011
CN 104680990 A * 6/2015
(Continued)

*Primary Examiner* — Kirk W Hermann
(74) *Attorney, Agent, or Firm* — Nathan & Associates; Menachem Nathan

(57) ABSTRACT

A array substrate includes a plurality of stages of cascaded GOA units and a plurality of corresponding clock signal lines electrically connected to them. Each stage of GOA units includes a first output transistor. In the plurality of stages of GOA units, the plurality of first output transistors increase in size along a predetermined direction. The predetermined direction is a signal transmission direction of any of the clock signal lines.

16 Claims, 5 Drawing Sheets

(56) References Cited

U.S. PATENT DOCUMENTS

| | | | | |
|---|---|---|---|---|
| 2018/0031937 | A1* | 2/2018 | Takahashi | G02F 1/136286 |
| 2018/0053471 | A1 | 2/2018 | Lin et al. | |
| 2018/0284551 | A1* | 10/2018 | Shim | G02F 1/136286 |
| 2019/0371248 | A1* | 12/2019 | Kim | G09G 3/3233 |
| 2020/0076415 | A1* | 3/2020 | Lee | H01L 29/2003 |
| 2020/0211477 | A1* | 7/2020 | Lai | G09G 3/3233 |
| 2021/0225316 | A1* | 7/2021 | Huang | G09G 3/3677 |

FOREIGN PATENT DOCUMENTS

| | | | | |
|---|---|---|---|---|
| CN | 108694921 | A | 10/2018 | |
| CN | 109272921 | A | 1/2019 | |
| CN | 111090202 | A | 5/2020 | |
| WO | WO-2017096704 | A1 * | 6/2017 | G02F 1/13454 |

* cited by examiner

ARRAY SUBSTRATE INCLUDING STAGES OF GATE ARRAY UNITS HAVING DIFFERENT SIZED OUTPUT TRANSISTORS, AND DISPLAY PANEL

FIELD OF THE DISCLOSURE

The present application relates to display technologies, and more particularly to an array substrate and a display panel.

DESCRIPTION OF RELATED ARTS

Gate Driver on Array (GOA) is a technology which integrates a gate driving circuit on an array substrate of a display panel to realize a line-by-line scan driving, and is therefore able to save an expense of the gate driving circuit and beneficial in lowering manufacturing cost and realizing a display panel with narrow bezel, and is utilized by various types of display panels.

TECHNICAL PROBLEMS

In existing GOA circuits, an output transistor in each stage of GOA units is used to output a scan signal according to a corresponding clock signal. Transmission loss of the clock signal on a clock signal line will cause a resistance-capacitance delay (RC delay) of an outputted waveform, making the scan signal formed with a rising edge and a falling edge. Also, rising time and falling time of the clock signals outputted by a plurality of stages of cascaded GOA units are inconsistent with each other, thereby causing unevenness in charging the display panel.

TECHNICAL SOLUTIONS

The present application provides an array substrate and a display panel, for solving the technical problem of unevenness in charging the display panel, caused by in consistence of rising time and falling time of scan signals outputted by a plurality of stages of GOA units in existing skills.

The present application provides an array substrate, including a plurality of stages of cascaded Gate on Array (GOA) units and a plurality of clock signal lines, the plurality of clock signal lines electrically connected to the plurality of stages of cascaded GOA units correspondingly;

each stage of the GOA units including a first output transistor, a source of the first output transistor connected to a corresponding clock signal line, a drain of the first output transistor electrically connected to a corresponding scan signal output end of the GOA unit, wherein in the plurality of stages of cascaded GOA units, the plurality of first output transistors increase in size along a predetermined direction, wherein the predetermined direction is a signal transmission direction of any of the clock signal lines.

In the array substrate provided in the present application, the plurality of first output transistor increase sequentially in size along the predetermined direction.

In the array substrate provided in the present application, the array substrate includes a plurality of first GOA unit areas arranged in a column direction, each of the first GOA unit areas including at least one of the GOA units, wherein the first output transistors in each of the first GOA unit areas are identical in size.

In the array substrate provided in the present application, each of the clock signal lines decreases in width along the predetermined direction.

In the array substrate provided in the present application, the plurality of clock signal lines are sequentially arranged along a row direction, wherein in the row direction, a width of the clock signal line close to the plurality of stages of cascaded GOA units is smaller than a width of the clock signal line away from the plurality of stages of cascaded GOA units.

In the array substrate provided in the present application, the array substrate further includes a plurality of clock signals, each stage of the GOA units connected to a corresponding clock signal line through a corresponding clock signal connecting line;

the array substrate including a plurality of second GOA unit areas arranged along a column direction, each of the second GOA unit areas including a plurality of GOA units, which are connected to the plurality of clock signal lines in a one-to-one correspondence, wherein in any of the second GOA unit areas, the clock signal connecting lines are different from each other in width.

In the array substrate provided in the present application, in the plurality of stages of cascaded GOA units, the clock signal connecting lines corresponding to the GOA units connecting to a same clock signal line are identical in width.

In the array substrate provided in the present application, each stage of the GOA units further includes a second output transistor; a source of the second output transistor is connected to the corresponding clock signal line, a drain of the second output transistor is electrically connected to a corresponding cascaded signal output end of the GOA unit, wherein in the plurality of stages of cascaded GOA units, the plurality of second output transistors increase in size along the predetermined direction.

In the array substrate provided in the present application, both of the first output transistors and the second output transistors are low temperature poly-silicon thin-film transistors or semiconductor oxide thin-film transistors.

Correspondingly, the present application further provides a display panel including an array substrate, which includes a plurality of stages of cascaded Gate on Array (GOA) units and a plurality of clock signal lines, the plurality of clock signal lines electrically connected to the plurality of stages of cascaded GOA units correspondingly;

each stage of the GOA units including a first output transistor, a source of the first output transistor connected to a corresponding clock signal line, a drain of the first output transistor electrically connected to a corresponding scan signal output end of the GOA unit, wherein in the plurality of stages of cascaded GOA units, the plurality of first output transistors increase in size along a predetermined direction, wherein the predetermined direction is a signal transmission direction of any of the clock signal lines.

In the display panel provided in the present application, the plurality of first output transistor increase sequentially in size along the predetermined direction.

In the display panel provided in the present application, the array substrate includes a plurality of first GOA unit areas arranged in a column direction, each of the first GOA unit areas including at least one of the GOA units, wherein the first output transistors in each of the first GOA unit areas are identical in size.

In the display panel provided in the present application, each of the clock signal lines decreases in width along the predetermined direction.

In the display panel provided in the present application, the plurality of clock signal lines are sequentially arranged along a row direction, wherein in the row direction, a width of the clock signal line close to the plurality of stages of cascaded GOA units is smaller than a width of the clock signal line away from the plurality of stages of cascaded GOA units.

In the display panel provided in the present application, the array substrate further includes a plurality of clock signal connecting lines, each stage of the GOA units connected to a corresponding clock signal line through a corresponding clock signal connecting line;

the array substrate including a plurality of second GOA unit areas arranged along a column direction, each of the second GOA unit areas including a plurality of GOA units, which are connected to the plurality of clock signal lines in a one-to-one correspondence, wherein in any of the second GOA unit areas, the clock signal connecting lines are different from each other in width.

In the display panel provided in the present application, in the plurality of stages of cascaded GOA units, the clock signal connecting lines corresponding to the GOA units connecting to a same clock signal line are identical in width.

In the display panel provided in the present application, each stage of the GOA units further includes a second output transistor; a source of the second output transistor is connected to the corresponding clock signal line, a drain of the second output transistor is electrically connected to a corresponding cascaded signal output end of the GOA unit, wherein in the plurality of stages of cascaded GOA units, the plurality of second output transistors increase in size along the predetermined direction.

In the display panel provided in the present application, both of the first output transistors and the second output transistors are low temperature poly-silicon thin-film transistors or semiconductor oxide thin-film transistors.

BENEFICIAL EFFECTS

The present application provides a display panel. An array substrate of the display panel includes a plurality of stages of cascaded GOA units and a plurality of clock signal lines. The plurality of clock signal lines are electrically connected to the plurality of stages of corresponding GOA units. Each stage of GOA units includes a first output transistor. By increasing the size of the plurality of first output transistors along a signal transmission direction of the clock signal lines, it can minimize the differences between scan signals outputted by the plurality of stages of cascaded GOA units, thereby increasing evenness in charging the display panel.

DESCRIPTION OF DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DESCRIPTION OF EMBODIMENTS OF THE DISCLOSURE

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

In the description of the present application, it needs to be understood that the terms "first" and "second" are used for descriptive purposes only, and should not be taken to indicate or imply relative importance, or implicitly indicate the indicated number of technical features. Thus, by defining a feature with "first" or "second", it may explicitly or implicitly include one or more of that features and should not be construed as a limit to the present application.

Figure 1:
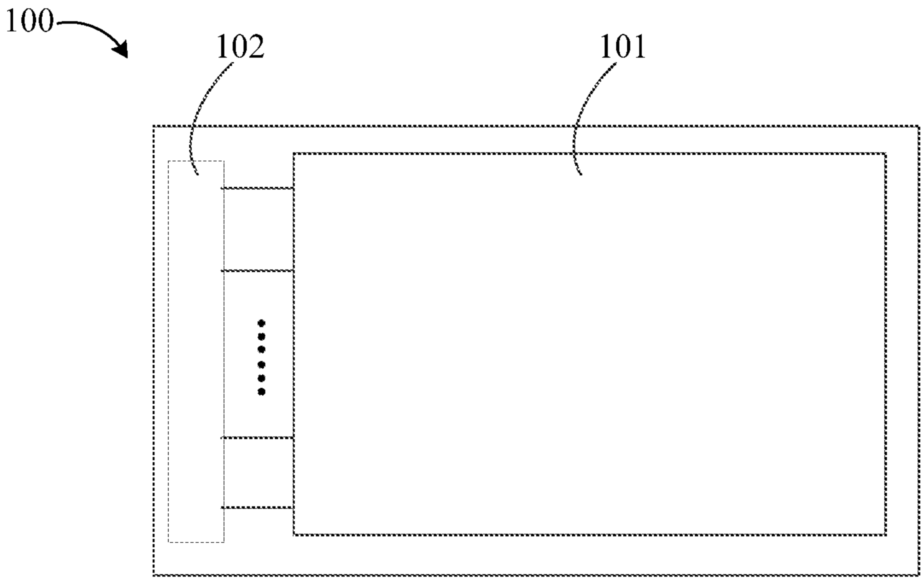
FIG. 1 is a schematic diagram illustrating a first structure of an array substrate provided in the present application.

FIG. 1 is a schematic diagram illustrating a first structure of an array substrate 100 provided in the present application. As shown in FIG. 1, the array substrate 100 includes a display region 101 and a Gate on Array (GOA) circuit 102 integratedly disposed at peripheral of the display region 101. It should be noted that the array substrates 100 provided in embodiments of the present application are illustrated by a single-side driving, for example, where the GOA circuit 102 is disposed at one side of the display region 101; however, it should not be construed as a limit to the present application. For instance, in some embodiments, a double-side driving or other types of driving may be adopted according to actual needs.

In addition, the following embodiments of the present application are illustrated by eight clock signals CK1 to CK8; however, the principle of the present application is also applicable to the GOA circuits with 2CK, 4CK, 6CK signals and so on. Therefore, it should not be construed as a limit to the present application.

Figure 2:
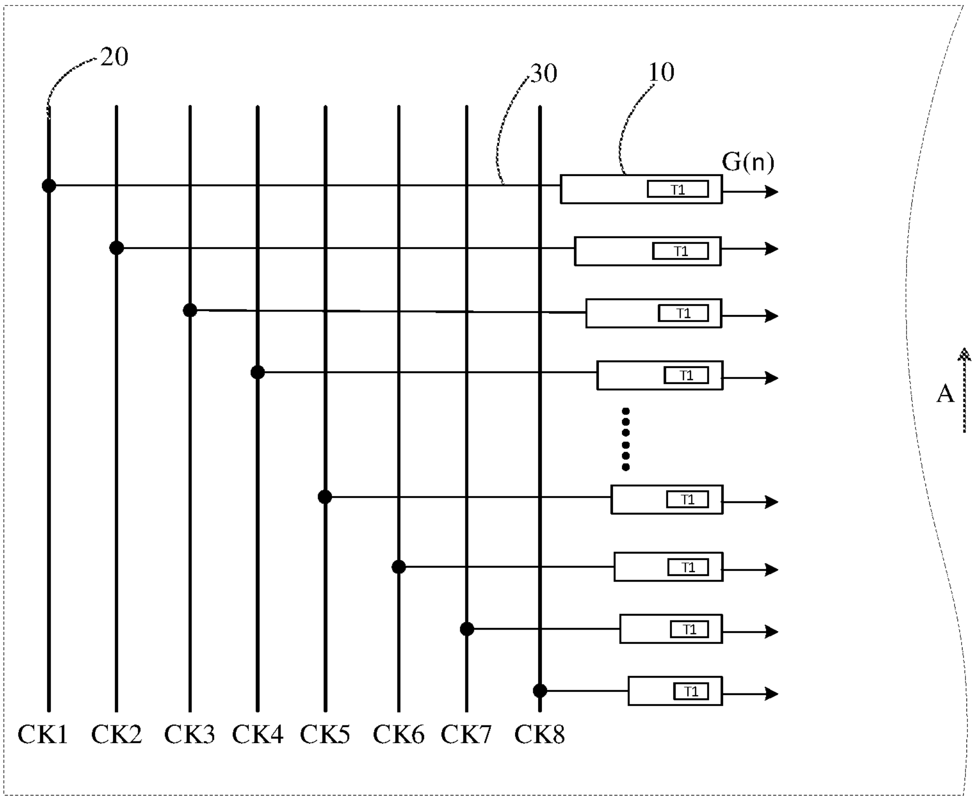
FIG. 2 is a schematic diagram illustrating a second structure of an array substrate provided in the present application.
Figure 3:
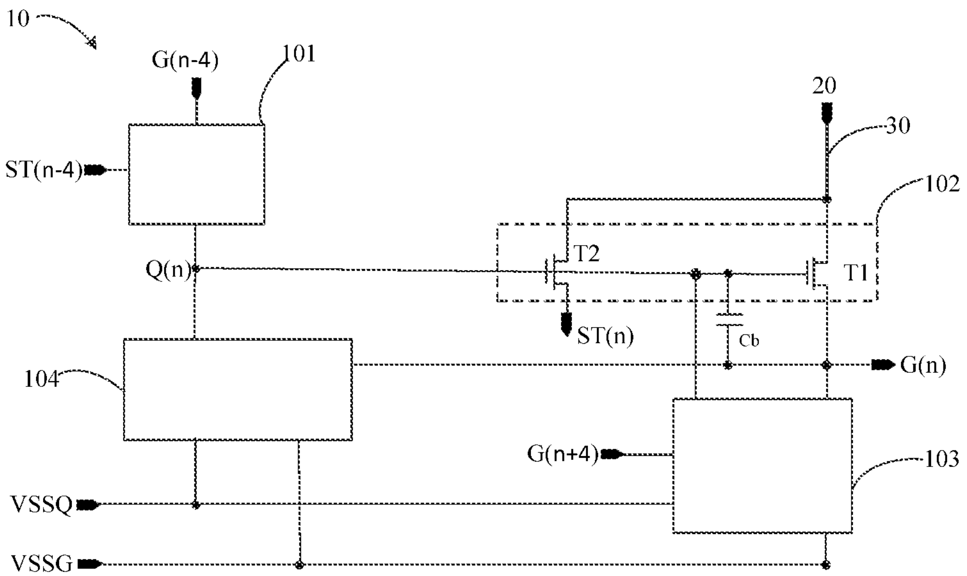
FIG. 3 is a schematic diagram illustrating a circuit structure of a GOA unit provided in the present application.

Specifically, refer to FIGS. 2 and 3 below. FIG. 2 is a schematic diagram illustrating a second structure of the array substrate provided in the present application. FIG. 3 is a structural schematic diagram illustrating a GOA unit provided in the present application. As shown in FIGS. 2 and 3. The array substrate includes a plurality of stages of cascaded GOA units 10 and a plurality of clock signal lines 20. The plurality of clock signal lines 20 are electrically connected to the plurality of cascaded GOA units 10 correspondingly. Each stage of GOA units 10 includes a first output transistor T1. The source of the first output transistor T1 is connected to a corresponding clock signal line 20. The drain of the first output transistor T1 is electrically connected to a scan signal output end G(n) of a corresponding GOA unit 10. In the plurality of stages of cascaded GOA units 10, the plurality of first output transistors T1 increase in size along a predetermined direction A. The predetermined direction A is a signal transmission direction of any of the clock signal lines 20.

It should be noted that since each stage of GOA units 10 has a complicated circuit structure, the size of the first output transistor T1 is indicated by the size of each stage of GOA units 10 in the embodiments of the present application in order to embody the size of the first output transistors T1 in the plurality of stages of cascaded GOA units 10.

Figure 4:
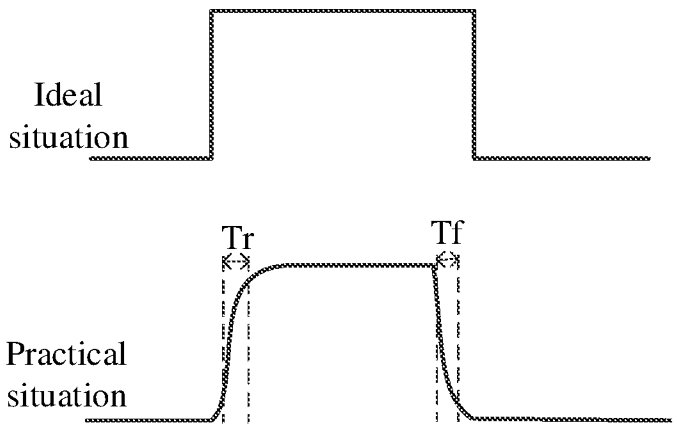
FIG. 4 is a diagram illustrating a waveform of a scan signal provided in the present application.

FIG. 4 is a diagram illustrating a waveform of a scan signal provided in the present application. As shown in FIG. 4, in ideal situation, the scan signal outputted from each stage of GOA units 10 is a square signal, of which rising time Tr and falling time Tf are zero. However, transmission loss of the clock signal on the clock signal line 20 will cause a resistance-capacitance delay (RC delay) of the outputted waveform, making a great difference between the rising time Tr and the falling time Tf of the scan signal outputted by each stage of GOA units and causing the display panel be charged unevenly. The rising time Tr refers to a time interval that the signal rises from 10% to 90% of a pulse peak; the falling time Tf refers to a time interval that the signal falls from 90% to 10% of a pulse peak.

The larger the first output transistor T21, the better its conductivity and accordingly, the less the rising time Tr and the falling time Tf of the outputted scan signal. Therefore, in the predetermined direction, by increasing the size of the plurality of first output transistors T1 in the plurality of stages of cascaded GOA units 10, the embodiment of the present application can compensate the transmission loss of the clock signals on the clock signal lines 20, thereby minimizing the differences between the scan signals outputted by the plurality of stages of cascaded GOA units 10.

Referring to FIG. 2 again, in an embodiment of the present application, the plurality of first output transistors T1 increase sequentially in size along the predetermined direction A.

In the embodiment of the present application, the size of the first output transistor T1 in each stage of GOA units 10 is adjusted so as to compensate a loss of a corresponding clock signal in each stage of GOA units 10 and minimize the differences between the scan signals outputted by the plurality of cascaded GOA units 10.

Figure 5:
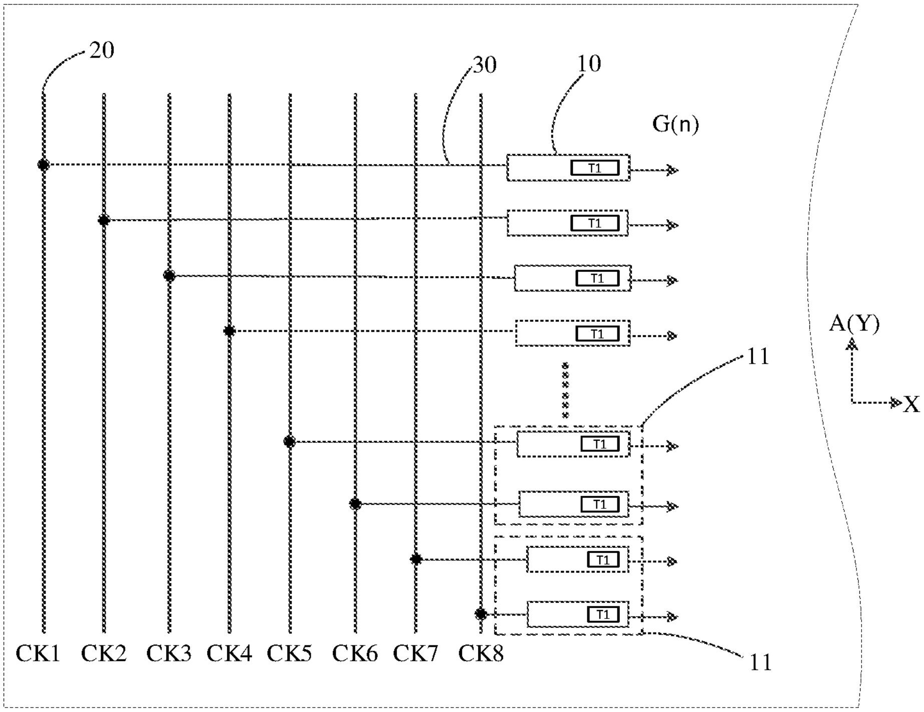
FIG. 5 is a schematic diagram illustrating a third structure of an array substrate provided in the present application.

In another embodiment of the present application, refer to FIG. 5, which is a schematic diagram illustrating a third structure of the array substrate provided in the present application. Different from the array substrate shown in FIG. 2, the array substrate provided in this embodiment of the present application includes a plurality of first GOA unit areas 11 arranged along a column direction Y, and each of the first GOA unit areas 11 includes at least one of the GOA units 10. The first output transistors 21 in each of the first GOA unit areas 11 are identical in size.

It can be understood that for a high-resolution display panel, the number of stages for the plurality of stages of cascaded GOA units 10 is large, and manufacturing processes will be more complicated if the first output transistors T1 in various stages of GOA units are different in size along the predetermined direction A. By arranging the plurality of first GOA unit areas 11 in the column direction Y to make the first output transistors T21 in each of the first GOA unit areas 11 be identical in size, the embodiment of the present application can simply the manufacturing processes and save the cost while minimizing the differences between the scan signals outputted by the plurality of stages of cascaded GOA units 10.

Further, each of the first GOA unit areas 11 may include a same number of GOA units 10, thereby reducing the difficulty of manufacturing processes in a further step. Of course, each of the first GOA unit areas 11 may include different numbers of GOA units 10. Specifically, it may be deployed depending on actual transmission loss of the clock signals on the clock signal lines 20.

Figure 6:
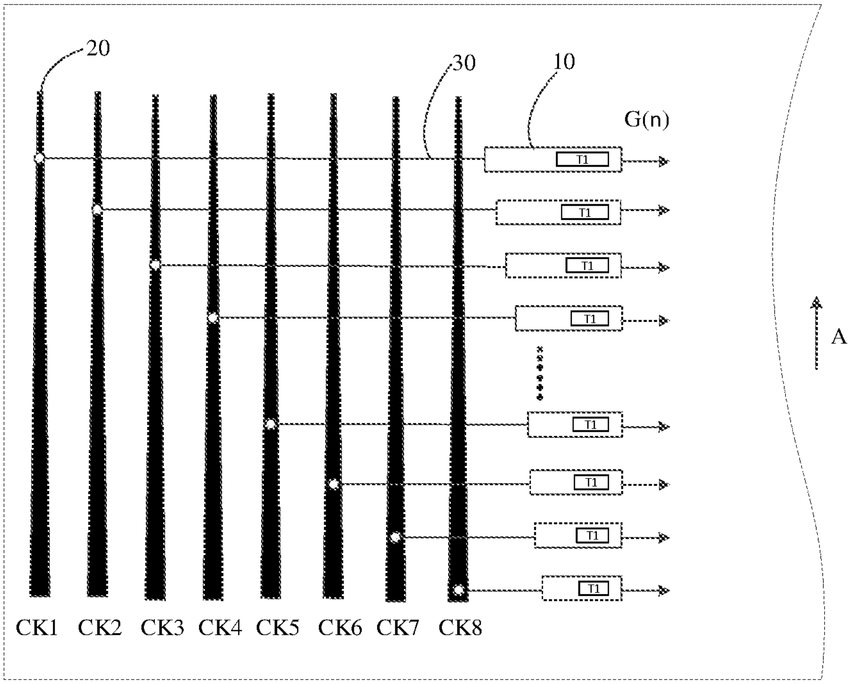
FIG. 6 is a schematic diagram illustrating a fourth structure of an array substrate provided in the present application.

FIG. 6 is a schematic diagram illustrating a fourth structure of the array substrate provided in the present application. Different from the array substrate shown in FIG. 2, this embodiment of the present application is provided that each of the clock signal lines 20 decreases in width along the predetermined direction A.

Specifically, in the predetermined direction A, by increasing the size of the plurality of first output transistor T1, the differences between the scan signals outputted by the plurality of stages of GOA units 10 can be minimized. At the same time, in the predetermined direction A, since the plurality of first output transistors 10 are different in size, the leaving room at corresponding positions on the array substrate are different. In the predetermined direction A, it may use the leaving room to increase the width of each of the clock signal lines 20.

It can be understood that the duration of the falling time Tf of a scan signal of a current row directly affects the speed of a switching-off state of a corresponding row of pixels. In ideal situation, at the end of a data signal of the current row, the scan signal needs to turn into a switching-off voltage level instantly. However, due to the presence of the falling time Tf, the scan signal of the current row cannot get into the switching-off state instantly. If the data signal of a next row has arrived at this time, it will cause the pixels of a corresponding row to be mis-charged by the data signal of the next row.

Therefore, while minimizing the differences between the scan signals outputted by the plurality of stages of cascaded GOA units 10, the embodiment of the present application utilizes the leaving room obtained by reducing the size of the first output transistors T1 to increase the width of the clock signal lines 20 as well as reducing the RC delay of the clock signal lines 20, thereby lowering the transmission loss of the clock signals on the clock signal lines 20. The rising time Tr and the falling time Tf of the clock signals outputted by the plurality of stages of cascaded GOA units are overall lowered, thereby preventing the display panel from suffering from mis-charging.

Further, in the array substrate provided in the embodiment of the present application, the array substrate further includes a plurality of clock signal connecting lines 30. Each stage of GOA units 10 is connected to a corresponding clock signal line 20 through a corresponding clock signal connecting line 30.

Figure 7:
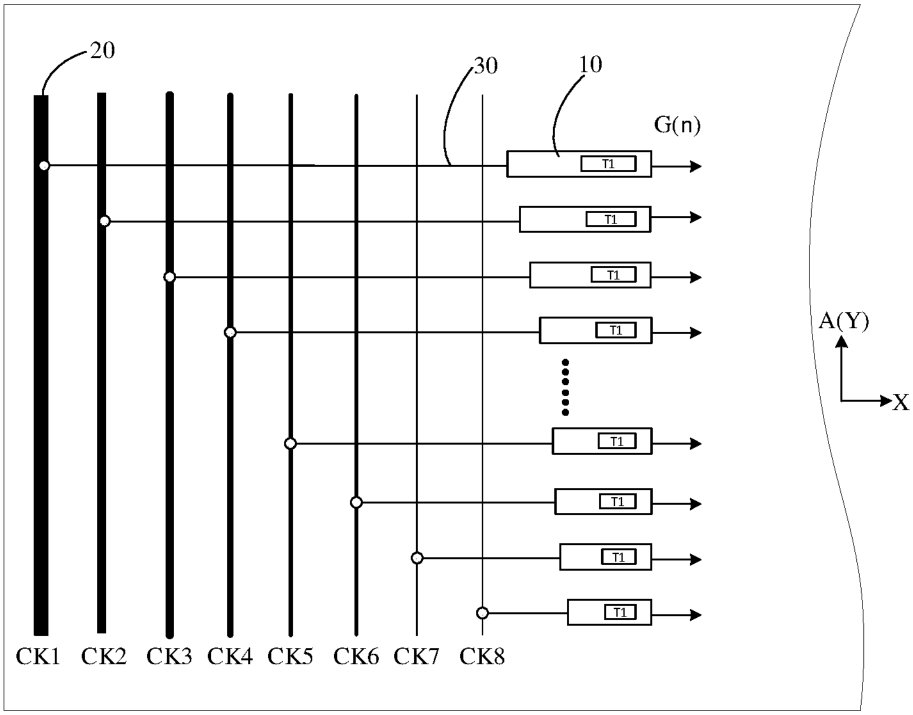
FIG. 7 is a schematic diagram illustrating a fifth structure of an array substrate provided in the present application.

FIG. 7 is a schematic diagram illustrating a fifth structure of the array substrate provided in the present application. Different from the array substrate shown in FIG. 2, this embodiment of the present application is provided that the plurality of clock signal lines 20 are sequentially arranged along a row direction X. In the row direction X, a width of the clock signal line 20 close to the plurality of stages of cascaded GOA units 10 is smaller than a width of the clock signal line 20 away from the plurality of stages of cascaded GOA units 10.

It can be understood that since each stage of GOA units 10 needs to connect to a corresponding clock signal line 20 via a corresponding clock signal connecting line 30, the clock signal connecting line 30 between a corresponding GOA unit 10 and the clock signal line 20 away from the plurality of stages of cascaded GOA units 10 is much longer with a large RC delay; the clock signal connecting line 30 between a corresponding GOA unit 10 and the clock signal line 20 close to the plurality of stages of cascaded GOA units 10 is much shorter with a small RC delay.

Therefore, in the row direction X, by decreasing the width of the clock signal line 20 close to the plurality of stages of cascaded GOA units 10 or increasing the width of the clock signal line 20 away from the plurality of stages of cascaded GOA units 10, it can compensate the signal transmission loss caused by the clock signal connecting line 30 corresponding to each stage of GOA units 10 and lower the differences between the scan signals outputted by the plurality of stages of cascaded GOA units 10 in a further step.

In some embodiments, the array substrate includes a plurality of second GOA unit areas 12 arranged along a column direction Y. Each of the second GOA unit areas 12 includes a plurality of GOA units 10. The plurality of GOA units 10 and the plurality of clock signal lines 20 have a one-to-one correspondence. In any of the second GOA unit areas 12, the clock signal connecting lines 30 are different from each other in width.

Figure 8:
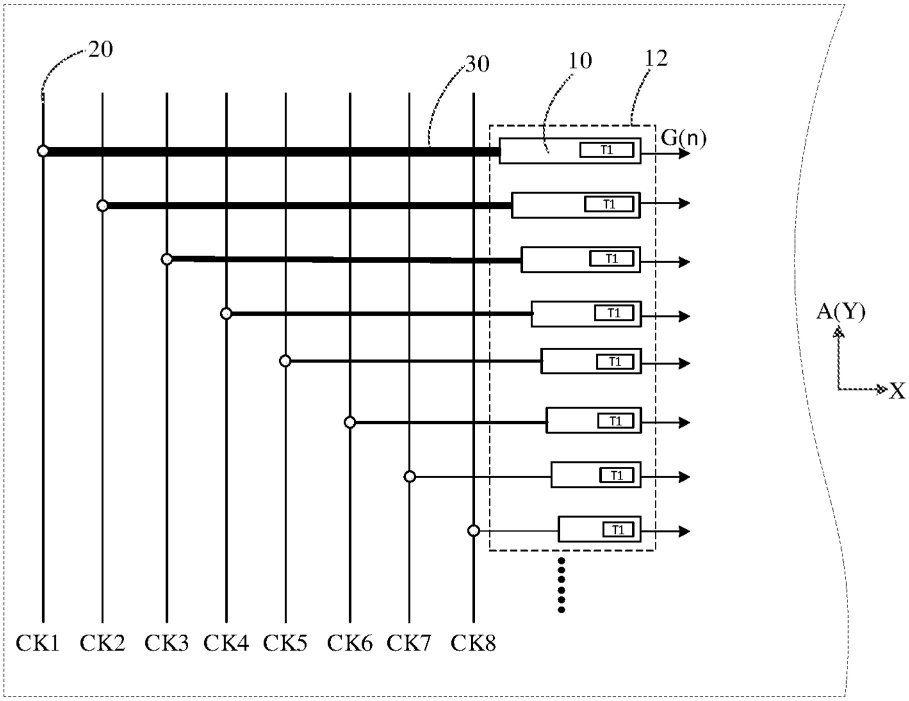
FIG. 8 is a schematic diagram illustrating a sixth structure of an array substrate provided in the present application.

Specifically, refer to FIG. 8, which is a schematic diagram illustrating a sixth structure of the array substrate provided in the present application. As shown in FIG. 8, in the predetermined direction A, the clock signal connecting lines 30 in each of the second GOA unit areas 12 gradually become large in width.

It can be understood that in the predetermined direction A, the transmission loss of the clock signals on the clock signal lines 20 gradually increases. Since each stage of GOA units 10 needs to electrically connect to a corresponding clock signal line 10 via a corresponding clock signal connecting line 30, it can reduce the RC delay of the clock signal connecting lines 30 by increasing the width of the clock signal connecting lines 30 in the predetermined direction A, thereby compensating the transmission loss of the clock signals on the clock signal lines 20 and minimizing the differences between the clock signals outputted by the plurality of stages of cascaded GOA units 10 in a further step.

Figure 9:
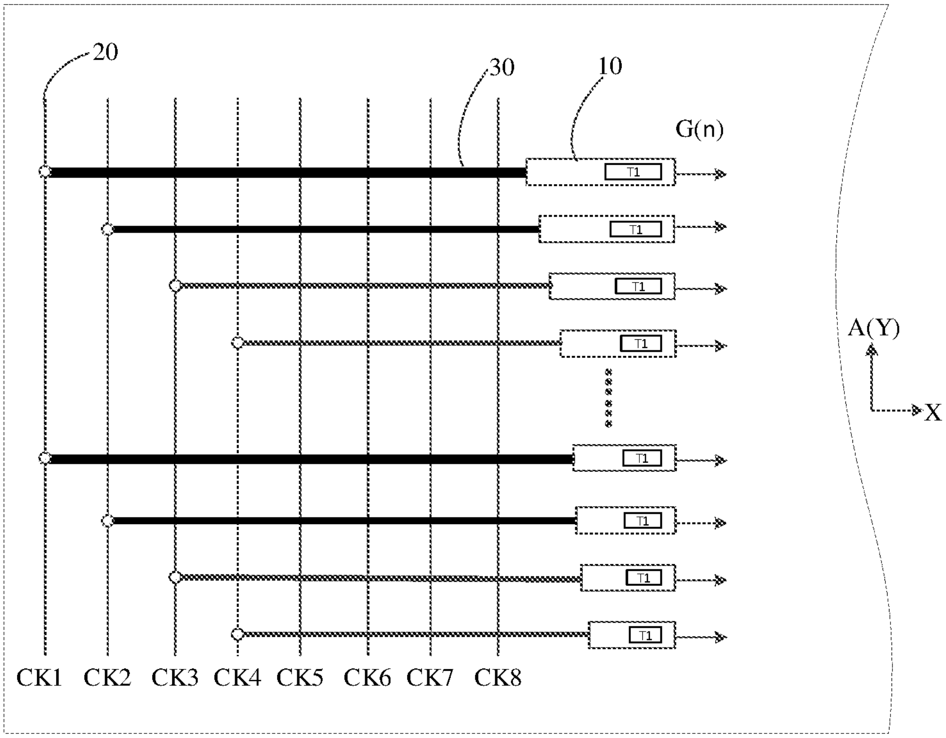
FIG. 9 is a schematic diagram illustrating a seventh structure of an array substrate provided in the present application.

Further, refer to FIG. 9, which is a schematic diagram illustrating a seventh structure of the array substrate provided in the present application. As shown in FIG. 9, in the plurality of stages of cascaded GOA units 10, the clock signal connecting lines 30 corresponding to the GOA units 10 connecting to a same clock signal line 20 are identical in width.

Specifically, in the predetermined direction A, when the clock signals outputted by the plurality of stages of cascaded GOA units T1 are made same by adjusting the size of the plurality of first output transistors T1, making the clock signal connecting lines 30 corresponding to the GOA units 10 connecting to a same clock signal line 20 be identical in width in a case of taking 8 GOA units 10 as a group, can ensure the consistence of the scan signals outputted by the plurality of stages of cascaded GOA units 10 in a further step.

Referring to FIG. 3 again, in the array substrate provided in the present application, each stage of GOA units 10 further includes a second output transistor T2. The source of the second output transistor T2 is connected to a corresponding clock signal line 20. The drain of the second output transistor T2 is electrically connected to a cascaded signal output end ST(n) of a corresponding GOA unit. In the plurality of stages of cascaded GOA units 10, increasing the size of the plurality of second output transistors T2 along the predetermined direction A can minimize the differences between cascaded signals outputted by the plurality of stages of cascaded GOA units, thereby improving stability of the plurality of stages of cascaded GOA units 10. In addition, utilizing the leaving room obtained by reducing the size of the second output transistors T2 can achieve a flexible control of the size of the first output transistors T1.

In addition, each stage of GOA units 10 includes a pull-up control module 101, a pull-up module 102, a pull-down module 103, a pull-down remaining module 104 and a bootstrap capacitor Cb.

The pull-up control module 101 is fed with a stage transmission signal of a last stage ST(n−4) and a scan signal of a last stage G(n−4) and is electrically connected to a first node Q(n). The pull-up control module 101 is configured to pull up the potential of the first node Q(n) under the control of the stage transmission signal of the last stage ST(n−4) and the scan signal of the last stage G(n−4).

The pull-up module 102 is electrically connected to the first node Q(n), a corresponding clock signal line 20 and a scan signal output end G(n), and is configured to output the stage transmission signal of a current stage and the scan signal of a current stage under the control of the potential of the first node Q(n).

The pull-down module 103 is fed with the stage transmission signal of a next stage G(n+4), a first low-level reference signal VSSQ and a second low-level reference signal VSSG and is electrically connected to the first node Q(n) and the scan signal output end G(n). The pull-down module 103 is configured to pull down the potential of the first node Q(n) and the potential of the scan signal output end G(n) under the control of the scan signal of the next stage G(n+4), the first low-level reference signal VSSQ and the second low-level reference signal VSSG.

The pull-down remaining module 104 is fed with the first low-level reference signal VSSQ and the second low-level reference signal VSSG and is electrically connected to the first node Q(n) and the scan signal output end G(n). The pull-down remaining module 104 is configured to maintain the potential of the first node Q(n) and the potential of the scan signal output end G(n).

One end of the bootstrap capacitor Cb is electrically connected to the first node Q(n). The other end of the bootstrap capacitor Cb is electrically connected to the scan signal output end G(n).

Specifically, the pull-up module 102 at least includes a first output transistor T1. The source of the first output transistor T1 is connected to a corresponding clock signal line 20. The drain of the first output transistor T1 is electrically connected to the scan signal output end G(n) of a corresponding GOA unit 10. The first output transistor T1 is configured to output the scan signal according to a corresponding clock signal. It can adjust the rising time Tr and the falling time Tf of the scan signals outputted by the plurality of stages of cascaded GOA units 10, by changing the size of the first output transistors T1 in the predetermined direction A.

Further, the specific circuit structures of the pull-up control module 101, the pull-up module 102, the pull-down module 103 and the pull-down remaining module 104 may be deployed according to actual needs, and the present application is not limited thereto. The above illustration of specific circuit structure of the GOA units 10 is only for ease of understanding the technical schemes of the present application, and should not be construed as a limit to the present application.

It should be noted that the first output transistors T1 and the second output transistors T2 adopted in all the embodiments of the present application can be thin-film transistors or field-effect transistors or other devices having same properties. Since the source and the drain of the transistor utilized herein are symmetric, the source and the drain are interchangeable. In the embodiments of the present application, in order to distinguish the two electrodes of the transistor except for a gate, one of the two electrodes is called a source and the other of the two electrodes is called a drain. A middle end of the switch transistor is the gate, a signal input end of which is the source and a signal output end of which is the drain, as specified according to a shape or pattern shown in the appending figures. In addition, the transistors utilized in the embodiments of the present application may include P-type transistors and/or N-type transistors. The P-type transistor is turned on when the gate is at low voltage level and is turned off when the gate is at high voltage level; the N-type transistor is turned on when the gate is at high voltage level and is turned off when the gate is at low voltage level.

In addition, in the embodiments of the present application, the first output transistors T1 and the second output transistors T2 can be low temperature poly-silicon thin-film transistors, semiconductor oxide thin-film transistors or amorphous-silicon (a-Si) thin-film transistors. It can be deployed according to actual needs, and the embodiments of the present application are not limited thereto.

Correspondingly, the present application further provides a display panel. The display panel includes the array substrates according to any of above-described embodiments, which in not repeated herein. The display panel can be, but is not limited to, a liquid crystal display panel or an organic light emitting diode (OLED) display panel.

The present application provides a display panel. An array substrate of the display panel includes a plurality of stages of cascaded GOA units and a plurality of clock signal lines. The plurality of clock signal lines are electrically connected to the plurality of stages of corresponding GOA units. Each stage of GOA units includes a first output transistor. By increasing the size of the plurality of first output transistors along a signal transmission direction of the clock signal lines, it can minimize the differences between scan signals outputted by the plurality of stages of cascaded GOA units, thereby increasing evenness in charging the display panel.

Hereinbefore, the array substrate and the display panel provided in the embodiments of the present application are introduced in detail, the principles and implementations of the present application are set forth herein with reference to specific examples, descriptions of the above embodiments are merely served to assist in understanding the technical solutions and essential ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. An array substrate, comprising a plurality of stages of cascaded Gate on Array (GOA) units and a plurality of clock signal lines, the plurality of clock signal lines electrically connected to the plurality of stages of cascaded GOA units correspondingly;

each stage of the GOA units comprising a first output transistor, a source of the first output transistor connected to a corresponding clock signal line, a drain of the first output transistor electrically connected to a corresponding scan signal output end of the GOA unit, wherein in the plurality of stages of cascaded GOA units, the plurality of first output transistors increase in size along a predetermined direction, wherein the predetermined direction is a signal transmission direction of any of the clock signal lines, each stage of the GOA units further comprising a second output transistor; a source of the second output transistor is connected to the corresponding clock signal line, a drain of the second output transistor is electrically connected to a corresponding cascaded signal output end of the GOA unit, wherein in the plurality of stages of cascaded GOA units, the plurality of second output transistors increase in size along the predetermined direction.

2. The array substrate according to claim 1, wherein the plurality of first output transistors increase sequentially in size along the predetermined direction.

3. The array substrate according to claim 1, comprising a plurality of first GOA unit areas arranged in a column direction, each of the first GOA unit areas comprising at least one of the GOA units, wherein the first output transistors in each of the first GOA unit areas are identical in size.

4. The array substrate according to claim 1, wherein each of the clock signal lines decreases in width along the predetermined direction.

5. The array substrate according to claim 1, wherein the plurality of clock signal lines are sequentially arranged along a row direction, wherein in the row direction, a width of one of the clock signal lines that is close to the plurality of stages of cascaded GOA units is smaller than a width of one of the clock signal lines that is away from the plurality of stages of cascaded GOA units.

6. The array substrate according to claim 1, further comprising a plurality of clock signal connecting lines, each stage of the GOA units is connected to a corresponding clock signal line through a corresponding clock signal connecting line;

the array substrate comprising a plurality of second GOA unit areas arranged along a column direction, each of the second GOA unit areas comprising a plurality of GOA units, which are connected to the plurality of clock signal lines in a one-to-one correspondence, wherein in any of the second GOA unit areas, the clock signal connecting lines are different from each other in width.

7. The array substrate according to claim 6, wherein in the plurality of stages of cascaded GOA units, the clock signal connecting lines corresponding to the GOA units connecting to a same clock signal line are identical in width.

8. The array substrate according to claim 1, wherein both of the first output transistors and the second output transistors are low temperature poly-silicon thin-film transistors or semiconductor oxide thin-film transistors.

9. A display panel, comprising an array substrate comprising:

a plurality of stages of cascaded Gate on Array (GOA) units and a plurality of clock signal lines, the plurality of clock signal lines electrically connected to the plurality of stages of cascaded GOA units correspondingly;

each stage of the GOA units comprising a first output transistor, a source of the first output transistor connected to a corresponding clock signal line, a drain of the first output transistor electrically connected to a corresponding scan signal output end of the GOA unit, wherein in the plurality of stages of cascaded GOA units, the plurality of first output transistors increase in size along a predetermined direction, wherein the predetermined direction is a signal transmission direction of any of the clock signal lines, each stage of the GOA units further comprising a second output transistor; a source of the second output transistor is connected to the corresponding clock signal line, a drain of the second output transistor is electrically connected to a corresponding cascaded signal output end of the GOA unit, wherein in the plurality of stages of cascaded GOA units, the plurality of second output transistors increase in size along the predetermined direction.

10. The display panel according to claim 9, wherein the plurality of first output transistors increase sequentially in size along the predetermined direction.

11. The display panel according to claim 9, wherein the array substrate comprises a plurality of first GOA unit areas arranged in a column direction, each of the first GOA unit areas comprising at least one of the GOA units, wherein the first output transistors in each of the first GOA unit areas are identical in size.

12. The display panel according to claim 9, wherein each of the clock signal lines decreases in width along the predetermined direction.

13. The display panel according to claim 9, wherein the plurality of clock signal lines are sequentially arranged along a row direction, wherein in the row direction, a width of one of the clock signal lines that is close to the plurality of stages of cascaded GOA units is smaller than a width of one of the clock signal lines that is away from the plurality of stages of cascaded GOA units.

14. The display panel according to claim 9, wherein the array substrate further comprises a plurality of clock signal connecting lines, each stage of the GOA units connected to a corresponding clock signal line through a corresponding clock signal connecting line;

the array substrate comprising a plurality of second GOA unit areas arranged along a column direction, each of the second GOA unit areas comprising a plurality of GOA units, which are connected to the plurality of clock signal lines in a one-to-one correspondence, wherein in any of the second GOA unit areas, the clock signal connecting lines are different from each other in width.

15. The display panel according to claim 14, wherein in the plurality of stages of cascaded GOA units, the clock signal connecting lines corresponding to the GOA units connecting to a same clock signal line are identical in width.

16. The display panel according to claim 9, wherein both of the first output transistors and the second output transistors are low temperature poly-silicon thin-film transistors or semiconductor oxide thin-film transistors.

* * * * *